United States Patent
Khasnis et al.

(10) Patent No.: US 12,474,482 B2
(45) Date of Patent: Nov. 18, 2025

(54) SYSTEM AND METHOD FOR GLOBAL NAVIGATION SATELLITE SYSTEM (GNSS) POSITION ESTIMATION

(71) Applicant: Signalchip Innovations Private Limited, Bangalore (IN)

(72) Inventors: Himamshu Gopalakrishna Khasnis, Bangalore (IN); Navaneetha Krishnamurthy, Bangalore (IN)

(73) Assignee: SIGNALCHIP INNOVATIONS PRIVATE LIMITED, Bangalore (IN)

( * ) Notice: Subject to any disclaimer, the term of this patent is extended or adjusted under 35 U.S.C. 154(b) by 346 days.

(21) Appl. No.: 18/091,864

(22) Filed: Dec. 30, 2022

(65) Prior Publication Data

US 2023/0213662 A1 Jul. 6, 2023

(30) Foreign Application Priority Data

Dec. 31, 2021 (IN) .............................. 202141062289

(51) Int. Cl.
*G01S 19/30* (2010.01)
*G01S 19/29* (2010.01)
*G01S 19/37* (2010.01)

(52) U.S. Cl.
CPC .............. *G01S 19/30* (2013.01); *G01S 19/29* (2013.01); *G01S 19/37* (2013.01)

(58) Field of Classification Search
CPC .......... G01S 19/30; G01S 19/29; G01S 19/37; G01S 19/24; G01S 19/35
See application file for complete search history.

(56) References Cited

U.S. PATENT DOCUMENTS

| 5,134,407 A * | 7/1992 | Lorenz | G01S 19/24 |
| | | | 342/352 |
| 2009/0110134 A1* | 4/2009 | Yuan | G01S 19/37 |
| | | | 342/357.77 |

OTHER PUBLICATIONS

J. C. Candy, "An Overview of Basic Concepts," in Delta-Sigma Data Converters: Theory, Design, and Simulation, edited by Steven R. Norsworthy, Richard Schreier and Gabor C. Temes, IEEE, 1997, pp. 1-43. (Year: 1997).*

(Continued)

*Primary Examiner* — Vladimir Magloire
*Assistant Examiner* — Ashley Brown Raynal

(57) ABSTRACT

A global navigation satellite system (GNSS) receiver for improving accuracy of a GNSS position estimation using a sigma-delta based fractional interpolation in a delay-locked loop is provided. The GNSS receiver includes a correlator, a code phase discriminator, a first loop filter, a code numerically controlled oscillator, and a sigma-delta modulator. The correlator correlates a GNSS C/A signal received from a satellite with a locally generated GNSS C/A code by multiplying the locally generated GNSS C/A code with incoming data samples. The code phase discriminator determines a delay between the locally generated GNSS C/A code and the GNSS C/A signal received from the satellite. The first loop filter averages the delay measured by the code phase discriminator. The code numerically controlled oscillator generates the local GNSS C/A code based on a unique CA code that corresponds to the satellite. The sigma-delta modulator imparts a fractional delay to the locally generated GNSS C/A code based on an output of the first loop filter.

13 Claims, 4 Drawing Sheets

(56) References Cited

OTHER PUBLICATIONS

Yongchul Song and Beomsup Kim, "A 14-b direct digital frequency synthesizer with sigma-delta noise shaping," in IEEE Journal of Solid-State Circuits, vol. 39, No. 5, pp. 847-851, May 2004. (Year: 2004).*

* cited by examiner

SYSTEM AND METHOD FOR GLOBAL NAVIGATION SATELLITE SYSTEM (GNSS) POSITION ESTIMATION

CROSS-REFERENCE TO RELATED APPLICATIONS

This application claims priority to the Indian provisional patent application no. 202141062289 filed on Dec. 31, 2021, the complete disclosures of which, in their entirety, are herein incorporated by reference.

BACKGROUND

Technical Field

The embodiments herein generally relate to a global navigation satellite system (GNSS), and more particularly, to a system and method for improving accuracy of a global navigation satellite system (GNSS) position estimation using a sigma-delta based fractional interpolation in a delay-locked loop.

Description of the Related Art

The Global Positioning System (GPS), GLONASS, Galileo, or BeiDou are examples of a global navigation satellite system (GNSS). A global navigation satellite system (GNSS) typically employs a number of satellites circling the globe. A pseudo-random noise (PRN) code modulated on an electromagnetic signal emitted by a satellite is detected by a global navigation satellite system (GNSS) receiver. The bit sequence modulated on the broadcasted signal is examined, together with a receiver-generated replica of the code to be detected, for code detection. The global navigation satellite system (GNSS) receiver determines the position of a satellite signal receiver based on the time of arrival of the code for each of a sequence of satellites.

FIG. 1 is a block diagram that illustrates a global navigation satellite system (GNSS) receiver 100 for estimating the global navigation satellite system (GNSS) position of global navigation satellite system (GNSS) receivers according to the prior art. The global navigation satellite system (GNSS) receiver 100 correlates signal obtained from an analog front end 102 and a digital down-converter 104 with a standard defined CA code of global navigation satellite system (GNSS) satellites for global navigation satellite system (GNSS) lock. The global navigation satellite system (GNSS) receiver 100 finds a peak of correlation outputs. A time delay of a correlation peak is tracked by the global navigation satellite system (GNSS) receiver 100 using a delay-locked loop 106 to estimate a time instant of the correlation peak accurately. The time estimate of the peak of the correlation is obtained from different satellites that are used to compute a distance between a satellite and the global navigation satellite system (GNSS) receiver 100. Knowing the distance of the global navigation satellite system (GNSS) receiver 100 from more than 4 satellites, a concept of triangulation is used to determine the position, velocity, and time of the global navigation satellite system (GNSS) receiver 100.

The precision of the delay is reduced to smaller than over sampling rate using an interpolation filter 108. The interpolation filter 108 imparts a fractional delay on the input signal before correlation. By passing through the interpolation filter 108, the input signal obtains a group delay generated by the interpolation filter 108 that is mathematically computed. The interpolation filter 108 is given by $$y[n]=(1-a)*x[n]+a*x[n-1]$$

where, a is a fractional delay ranging from 0 to 1, but in a digital domain, a and x are quantized to some bit precisions. The interpolation filter 108 is a liner filter. The delay step of x[n] is determined by the accuracy of 'a". The higher accuracy or order of interpolation, the higher area and power consumption of the interpolation filter 108. Either the precision of 'a' needs to be high or higher-order interpolation needs to be used, to improve the accuracy of a time estimate. The accuracy of the PVT estimate is directly proportional to the accuracy of the estimate of the time corresponding to the correlation peak. Interpolators require integer multipliers with higher bit widths (>10 bits) and multipliers consume high area and power in digital circuits.

Therefore, there arises a need to address the technical drawbacks in existing technologies to improve the accuracy of the global navigation satellite system (GNSS) position estimation.

SUMMARY

In view of the foregoing, embodiments herein provide a global navigation satellite system (GNSS) receiver for improving accuracy of a global navigation satellite system (GNSS) position estimation using a sigma-delta based fractional interpolation in a delay-locked loop. The GNSS receiver includes a correlator, a code phase discriminator, a first loop filter, a code numerically controlled oscillator, and a sigma-delta modulator. The correlator correlates a GNSS C/A signal received from a satellite with a locally generated GNSS C/A code by multiplying the locally generated GNSS C/A code with incoming data samples. The code phase discriminator determines a delay between the locally generated GNSS C/A code and the GNSS C/A signal received from the satellite. The first loop filter averages the delay measured by the code phase discriminator. The code numerically controlled oscillator generates the local GNSS C/A code based on a unique CA code that corresponds to a satellite. The sigma-delta modulator imparts a fractional delay to the locally generated GNSS C/A code based on the output of the first loop filter. The fractional delay is imparted to increase the accuracy of tracking of a code delay of the GNSS C/A signal received from the satellite.

In some embodiments, the accuracy is improved by increasing a number of bits in an accumulator of the sigma-delta modulator.

In some embodiments, the sigma-delta modulator (i) quantizes the fractional delay of the locally generated GNSS C/A code into integer sample delays, (ii) accumulates the quantization noise, wherein the accumulated quantization noise is corrected for a next output and accumulated for a remaining error and (iii) continuously performs error accumulation and correction to achieve noise shaping which results in low quantization noise in lower frequencies and high noise in higher frequencies. In some embodiments, the noise in higher frequencies is filtered out by averaging post-correlation.

In some embodiments, the sigma-delta modulator is implemented in dedicated digital circuits or a processor using an embedded firmware.

In some embodiments, the first loop filter is a digital filter that removes instantaneous variations and smoothens the delay measured by the code phase discriminator.

In some embodiments, the code numerically controlled oscillator imparts the integer samples delay to the locally generated GNSS C/A code based on an output of the sigma-delta modulator.

In some embodiments, the sigma-delta modulator converts a slow-varying fractional number into a fast-varying integer number which is a code phase in GNSS Delay Locked Loop (DLL).

In some embodiments, the GNSS receiver includes an integrate and dump unit, a carrier phase discriminator, and a second loop filter. The integrate and dump unit accumulates correlation peaks. The carrier phase discriminator determines a phase error in the correlation peaks. The second loop filter averages a phase error measured by the carrier phase discriminator.

In some embodiments, the GNSS receiver includes a carrier numerically controlled oscillator that generates a sinusoid to correct a phase error in correlation peaks. In some embodiments, frequency of the sinusoid generated by the carrier numerically controlled oscillator is directly proportional to an averaged phase error at an output of a second loop filter of the GNSS receiver.

In some embodiments, the sigma-delta modulator includes a difference amplifier, an integrator, and a comparator. The difference amplifier calculates a difference between two incoming signals as X=D−P, wherein X is a phase error between P, an integer phase delay imparted to the GNSS C/A code, and an input fractional delay (D). The integrator accumulates the phase error as: $Y(n)=X+Y(n-1)$, wherein Y is an integrated phase error and n is the sample index, and $Y(0)=0$. The comparator compares an integrated phase error to 1 and when the phase error is higher than 1 output P sets to 1 as $$P = \begin{cases} 1 & \text{if } Y \geq 0 \\ 0 & \text{otherwise} \end{cases}$$

In one aspect, a method for improving accuracy of a global navigation satellite system (GNSS) position estimation using a sigma-delta based fractional interpolation in a delay-locked loop using a global navigation satellite system (GNSS) receiver is provided. The method includes (i) correlating, using a correlator, a GNSS C/A signal received from a satellite with a locally generated GNSS C/A code by multiplying the locally generated GNSS C/A code with incoming data samples, (ii) determining, using a code phase discriminator, a delay between the locally generated GNSS C/A code and the GNSS C/A signal received from the satellite, (iii) averaging, using a first loop filter, the delay measured by the code phase discriminator, (iv) generating, a code numerically controlled oscillator, the local GNSS C/A code based on a unique CA code that corresponds to a satellite, and (v) imparting, using a sigma-delta modulator, a fractional delay to the locally generated GNSS C/A code based on the output of the first loop filter. The fractional delay is imparted to increase the accuracy of tracking of a code delay of GNSS C/A signal received from the satellite.

In some embodiments, the accuracy is improved by increasing a number of bits in an accumulator of the sigma-delta modulator.

In some embodiments, the method includes quantizing, using the sigma-delta modulator, the fractional delay of the locally generated GNSS C/A code into integer sample delays, (ii) accumulating, using the sigma-delta modulator, the quantization noise; and (iii) continuously performing, using the sigma-delta modulator, error accumulation and correction to achieve noise shaping which results in low quantization noise in lower frequencies and high noise in higher frequencies, wherein the noise in higher frequencies is filtered out by averaging post correlation. In some embodiments, the accumulated quantization noise is corrected for a next output and accumulated for a remaining error.

In some embodiments, the code numerically controlled oscillator imparts the integer samples delay to the locally generated GNSS C/A code based on an output of the sigma-delta modulator.

In some embodiments, the method includes converting, using the sigma-delta modulator, a slow varying fractional number into a fast-varying integer number which is a code phase in GNSS Delay Locked Loop (DLL).

In some embodiments, the method includes accumulating, using an integrate and dump unit, correlation peaks; determining, using a carrier phase discriminator, a phase error in the correlation peaks; and averaging, using a second loop filter, a phase error measured by the carrier phase discriminator.

In some embodiments, the method includes generating, using a carrier numerically controlled oscillator, a sinusoid to correct a phase error in correlation peaks. In some embodiments, a frequency of the sinusoid generated by the carrier numerically controlled oscillator is directly proportional to an averaged phase error at an output of a second loop filter of the GNSS receiver.

The GNSS receiver is used in applications such as object tracking and remote control. These devices need to run on battery for a very long time and power consumption is a crucial factor for such applications. The loop stability of the GNSS receiver is high as the sigma-delta modulator is located outside of a main GNSS tracking loop. Imparting fractional delay leads to high accuracy in the tracking of the correlation delay of the GNSS C/A code. This leads to high accuracy position, velocity, and time estimate in the GNSS receiver.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 2:
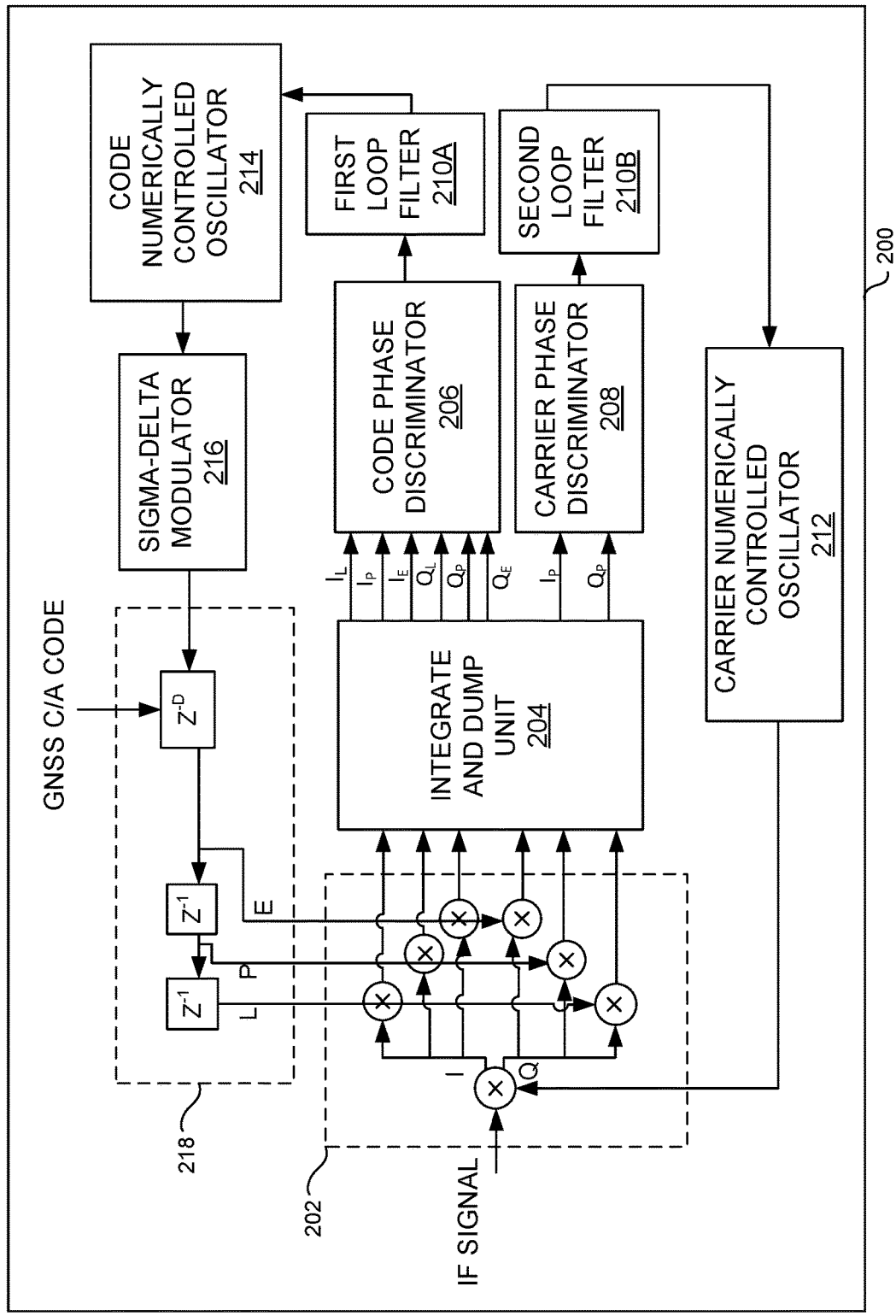
FIG. 2 is a block diagram that illustrates a global navigation satellite system (GNSS) receiver for improving accuracy of a global navigation satellite system (GNSS) position estimation using a sigma-delta based fractional interpolation in a delay-locked loop.
Figure 3:
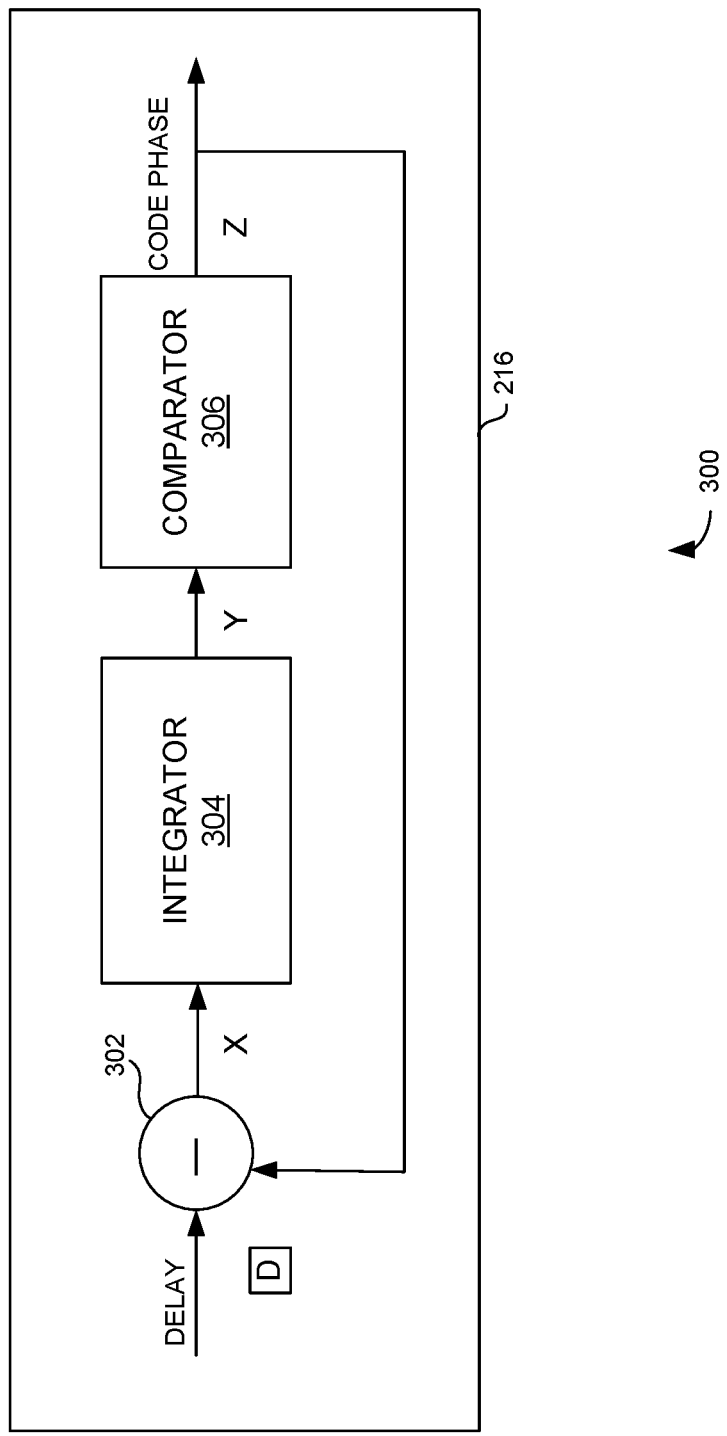
FIG. 3 is an exemplary exploded diagram of a sigma-delta modulator of the global navigation satellite system (GNSS) receiver of FIG. 1 according to some embodiments herein.
Figure 4:
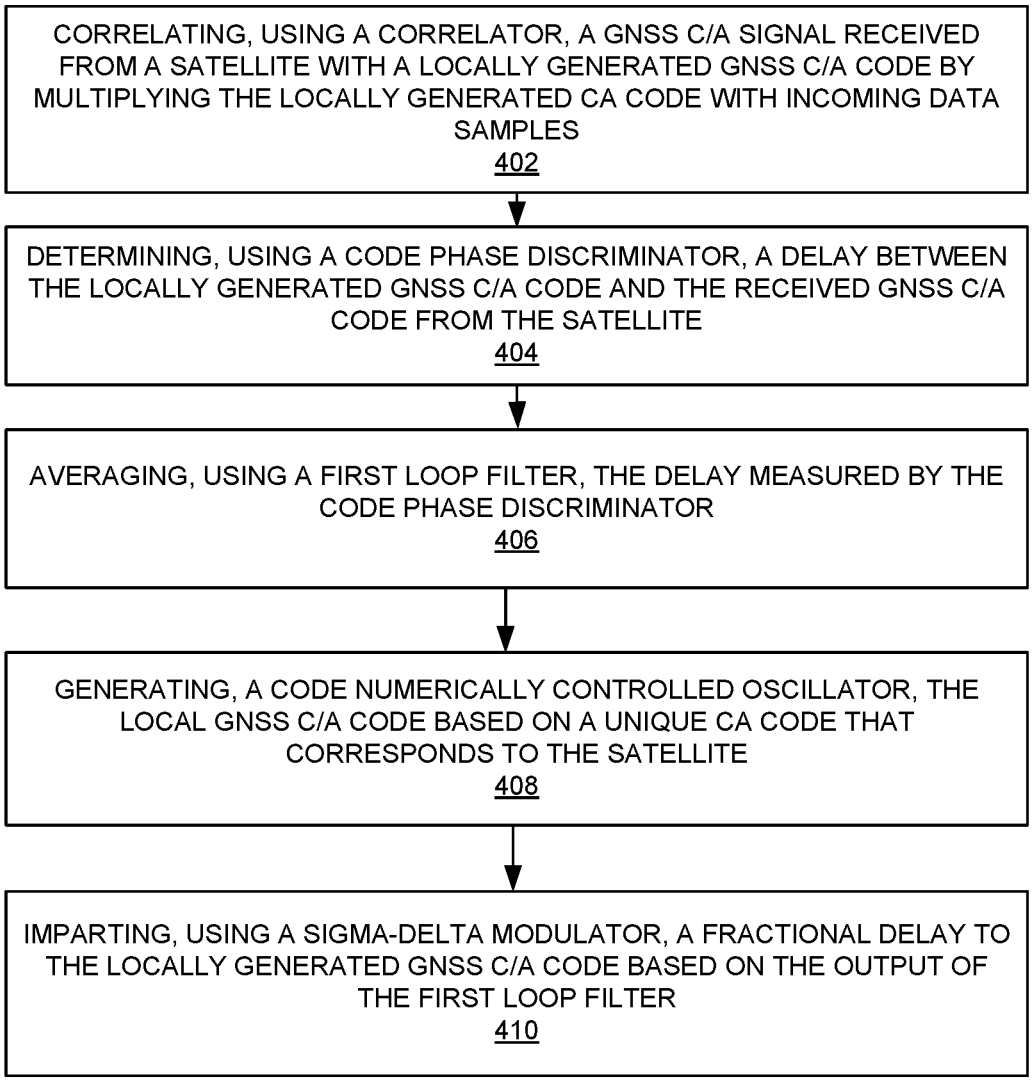
FIG. 4 is a flow diagram that illustrates a method for improving the accuracy of a global navigation satellite system (GNSS) position estimation using a sigma-delta based fractional interpolation in a delay-locked loop according to some embodiments herein.

As mentioned, there remains a need for a system and a method for improving the accuracy of a global navigation satellite system (GNSS) position estimation. Referring now to the drawings, and more particularly to FIGS. 2 through 4, where similar reference characters denote corresponding features consistently throughout the figures, there are shown preferred embodiments.

FIG. 2 is a block diagram 201 that illustrates a global navigation satellite system (GNSS) receiver 200 for improving accuracy of a global navigation satellite system (GNSS) position estimation using a sigma-delta based fractional interpolation in a delay-locked loop according to some embodiments herein. The GNSS receiver 200 includes a correlator 202, an integrate and dump unit 204, a code phase discriminator 206, a carrier phase discriminator 208, a first loop filter 210A, a second loop filter 210B, a carrier numerically controlled oscillator 212, a code numerically controlled oscillator 214, a sigma-delta modulator 216 and a delay unit 218. The global navigation satellite system (GNSS) receiver 200 receives a GNSS C/A signal from a satellite. The correlator 202 correlates the GNSS C/A signal with a locally generated GNSS C/A code by multiplying the locally generated CA code with incoming data samples. In some embodiments, the code phase discriminator 206, the first loop filter 210A, the code numerically controlled oscillator 214, the sigma-delta modulator 216 form the delay locked loop. In some embodiments, the carrier phase discriminator 208, the second loop filter 210B, and the carrier numerically controlled oscillator 212 form a phase-locked loop.

The integrate and dump unit 204 accumulates correlation peaks. The carrier phase discriminator 208 determines a phase error in the correlation peaks ($I_P$, and $Q_P$). The second loop filter 210B averages the phase error measured by the carrier phase discriminator 208. The carrier numerically controlled oscillator 212 produces a sinusoid to correct the phase error in the correlation peaks. In some embodiments, a frequency of the sinusoid generated by the carrier numerically controlled oscillator 212 is directly proportional to an averaged phase error at the second loop filter 210B output. In some embodiments, the sinusoid is used as input to a mixer in the correlator 202.

The code phase discriminator 206 determines a delay between the locally generated GNSS C/A code and the received GNSS C/A code from the satellite (e.g., $I_L$, $I_P$, $I_E$, $Q_L$, $Q_P$ and $Q_E$). The first loop filter 210A averages the delay measured by the code phase discriminator 206. In some embodiments, the first loop filter 210A is a digital filter that removes instantaneous variations and smoothens the delay measured by the code phase discriminator 206. The code numerically controlled oscillator 214 generates the local GNSS C/A code based on a unique CA code that corresponds to a satellite. The sigma-delta modulator 216 imparts a fractional delay to the locally generated GNSS C/A code based on an output of the first loop filter 210A output. The delay unit 218 delays the locally generated GNSS C/A code by integer sample delays. The correlator 202 uses the locally generated GNSS C/A code for correlating with the received signal from the satellite thus completing a loop.

In some embodiments, imparting fractional delay increases the accuracy of code delay tracking. The sigma-delta modulator 216 is realized in digital logic and takes very minimal area and power compared to an interpolation filter 202. The sigma-delta modulator 216 is realized using a simple accumulator saving significant area and power while obtaining the same accuracy as with the interpolation filter 202. In some embodiments, the sigma-delta modulator 216 is implemented in dedicated digital circuits or a processor using embedded firmware.

Figure 1:
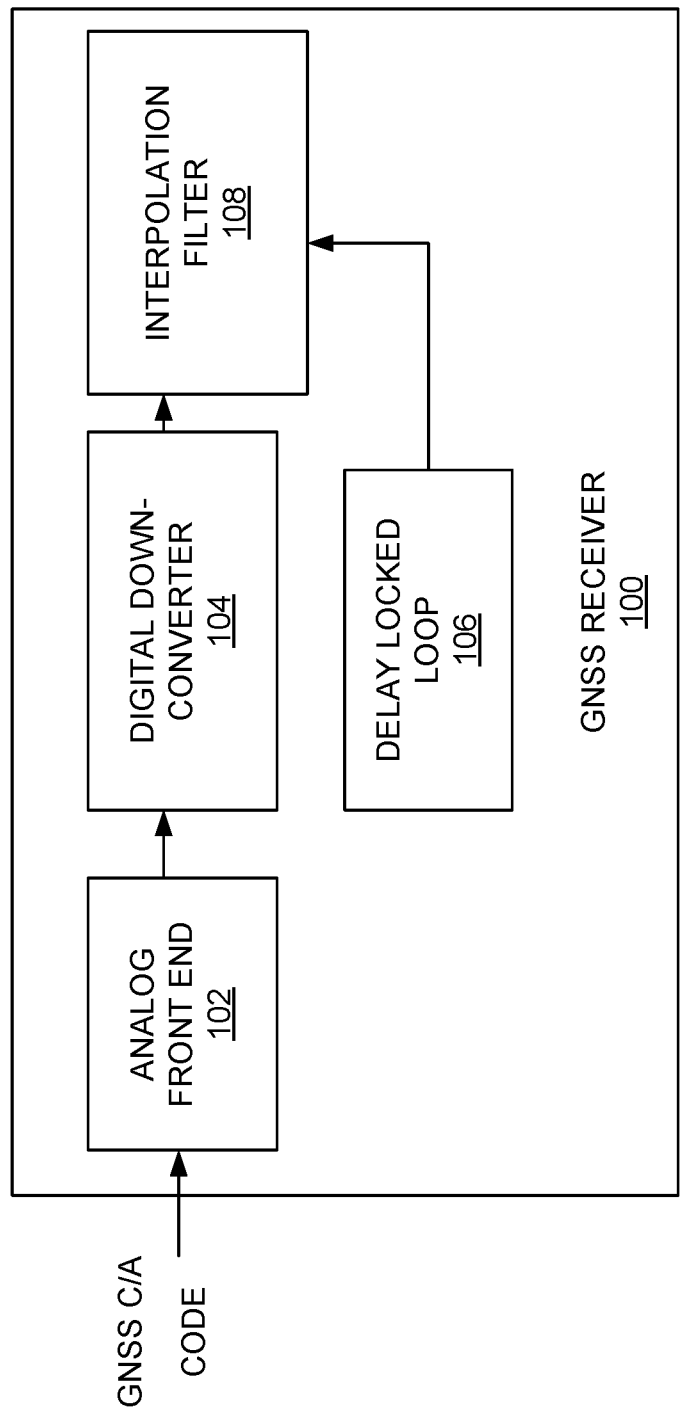
FIG. 1 is a block diagram that illustrates a Global navigation satellite system (GNSS) receiver for estimating Global navigation satellite system (GNSS) position of global navigation satellite system (GNSS) receivers according to the prior art.

FIG. 3 is an exemplary exploded diagram 300 of the sigma-delta modulator 216 of the global navigation satellite system (GNSS) receiver 200 of FIG. 1 according to some embodiments herein. The sigma-delta modulator 216 includes a difference amplifier 302, an integrator 304, and a comparator 306 connected in a feedback loop. The sigma-delta modulator 216 obtains a code delay (D) as an input which is in units of one digital sample interval. In some embodiments, the code delay (D) needs to be imparted into a GNSS C/A code. In some embodiments, the inputs are a fractional number and change over time. In some embodiments, the changes of the inputs are slow when compared to a digital sampling rate of received signal/CA code. In some embodiments, the output of the sigma-delta modulator 216 is a sequence of code phases (Z) that needs to be selected in the locally generated GNSS C/A code. The sigma-delta modulator 216 converts a slow-varying fractional number into a fast-varying integer number which is a code phase in GNSS Delay Locked Loop (DLL).

The difference amplifier 302 calculates a difference between the two incoming signals as $$X = D - P$$

X is a phase error between P, an integer phase delay imparted to the GNSS C/A code, and an input fractional delay (D). The integrator 304 accumulates this phase error as:

$$Y(n) = X + Y(n-1)$$

Y is an integrated phase error and n is the sample index and Y(0)=0. The comparator 306 compares the integrated phase error to 1 and when the phase error is higher than 1 output P sets to 1 as $$P = \begin{cases} 1 & \text{if } Y \geq 0 \\ 0 & \text{otherwise} \end{cases}$$

This sigma-delta modulator 216 imparts the fractional delay into the GNSS C/A code when viewed over multiple sample intervals of an order of a length of the GNSS C/A code with very minimal degradation in signal quality. In some embodiments, a computation required for the sigma-delta modulator 216 is one addition and one subtraction in contrast to an interpolator that uses one each of multiplication addition and subtraction. In some embodiments, the interpolator is mathematically represented as:

$$C_{delayed}(n)=D*(C(n)-C(n-1))+C(n-1)$$

The sigma-delta modulator 216 quantizes the required fractional delay into 1 to 2-bit integer sample delays and accumulates a quantization noise that is introduced. The accumulated quantization noise is corrected for in a next output and a remaining error is accumulated. The error accumulation and correction are repeated continuously to achieve noise shaping which results in low quantization noise in lower frequencies and high noise in higher frequencies. The quantization noise of the sigma-delta modulator 216 is pushed to a higher frequency and is filtered out by the averaging of an output post-correlation. An integer part of a required correlation delay is tracked by a delay-locked loop in software. In some embodiments, a fractional delay accuracy is achieved by selecting the precision of an input of the sigma-delta modulator 216.

FIG. 4 is a flow diagram that illustrates a method for improving accuracy of a global navigation satellite system (GNSS) position estimation using a sigma-delta based fractional interpolation in a delay-locked loop using the global navigation satellite system (GNSS) receiver 200 according to some embodiments herein. At a step 402, the method 400 includes correlating, using the correlator 202, a GNSS C/A signal received from a satellite with a locally generated GNSS C/A code by multiplying the locally generated CA code with incoming data samples. At a step 404, the method 400 includes determining, using the code phase discriminator 206, a delay between the locally generated GNSS C/A code and the received GNSS C/A code from the satellite. At a step 406, the method 400 includes averaging, using the first loop filter 210A, the delay measured by the code phase discriminator 206. At a step 408, the method 400 includes generating, using the code numerically controlled oscillator 214, the local GNSS C/A code based on a unique CA code that corresponds to a satellite. At step 410, the method 400 includes imparting, using the sigma-delta modulator 216, a fractional delay to the locally generated GNSS C/A code based on the output of the first loop filter 210A. The fractional delay is imparted to increase the accuracy of tracking of code delay of GNSS C/A code received from a satellite.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A global navigation satellite system (GNSS) receiver for improving the accuracy of a global navigation satellite system (GNSS) position estimation using a sigma-delta based fractional interpolation in a delay-locked loop, comprises:
    a correlator that correlates a GNSS C/A signal received from a satellite with a locally generated GNSS C/A code by multiplying the locally generated GNSS C/A code with incoming data samples;
    an integrate and dump unit that accumulates correlation peaks from the received GNSS C/A signal;
    a carrier phase discriminator that determines a phase error in the correlation peaks;
    a second loop filter that averages a phase error measured by the carrier phase discriminator;
    a carrier numerically controlled oscillator that generates a sinusoid to correct the phase error in the correlation peaks;
    a code phase discriminator that determines a code delay between the locally generated GNSS C/A code and the C/A code present in the received GNSS C/A signal after the phase error correction;
    a first loop filter that averages the code delay measured by the code phase discriminator;
    a code numerically controlled oscillator that generates the local GNSS C/A code based on a unique C/A code that corresponds to the satellite; and
    a sigma-delta modulator that imparts a fractional delay to the locally generated GNSS C/A code based on the averaged code delay received from the first loop filter, wherein the fractional delay is imparted to increase the accuracy of code delay tracking of the GNSS C/A signal received from the satellite, wherein the accuracy is improved by increasing a number of bits in an accumulator of the sigma-delta modulator.

2. The GNSS receiver of claim 1, wherein the sigma-delta modulator
    quantizes the fractional delay of the locally generated GNSS C/A code into integer sample delays;
    accumulates the quantization noise, wherein the accumulated quantization noise is corrected for a next output and accumulated for a remaining error; and
    continuously performs error accumulation and correction to achieve noise shaping which results in low quantization noise in lower frequencies and high noise in higher frequencies, wherein the noise in higher frequencies is filtered out by averaging post correlation.

3. The GNSS receiver of claim 1, wherein the sigma-delta modulator is implemented in dedicated digital circuits or a processor using an embedded firmware.

4. The GNSS receiver of claim 1, wherein the first loop filter is a digital filter that removes instantaneous variations and smoothens the delay measured by the code phase discriminator.

5. The GNSS receiver of claim 2, wherein the code numerically controlled oscillator imparts the integer samples delay to the locally generated GNSS C/A code based on an output of the sigma-delta modulator.

6. The GNSS receiver of claim 1, wherein the sigma-delta modulator converts a slow varying fractional number into a fast-varying integer number which is a code phase in GNSS Delay Locked Loop (DLL).

7. The GNSS receiver of claim 1, wherein a frequency of the sinusoid generated by the carrier numerically controlled oscillator is directly proportional to an averaged phase error at an output of a second loop filter of the GNSS receiver.

8. The GNSS receiver of claim 1, wherein the sigma-delta modulator comprises
a difference amplifier that calculates a difference between incoming signals as X=D−P, wherein X is a phase error between P, an integer phase delay imparted to the GNSS C/A code and an input fractional delay (D);
an integrator that accumulates the phase error as: Y(n)=X+Y(n−1)
wherein Y is an integrated phase error and n is the sample index and Y (0)=0; and
a comparator that compares an integrated phase error to 1 and when the phase error is higher than 0 output P sets to 1 as $$P = \begin{cases} 1 & \text{if } Y \geq 0 \\ 0 & \text{otherwise} \end{cases}.$$

9. A method for improving accuracy of a global navigation satellite system (GNSS) position estimation using a sigma-delta based fractional interpolation in a delay-locked loop using a global navigation satellite system (GNSS) receiver, comprising:
correlating, using a correlator, a GNSS C/A signal received from a satellite with a locally generated GNSS C/A code by multiplying the locally generated GNSS C/A code with incoming data samples;
accumulating, using an integrate and dump unit, correlation peaks from the received GNSS C/A signal;
determining, using a carrier phase discriminator, a phase error in the correlation peaks;
averaging, using a second loop filter, a phase error measured by the carrier phase discriminator;
generating, using a carrier numerically controlled oscillator, a sinusoid to correct the phase error in the correlation peaks;
determining, using a code phase discriminator, a code delay between the locally generated GNSS C/A code and the C/A code present in the received GNSS C/A signal after the phase error correction;
averaging, using a first loop filter, the code delay measured by the code phase discriminator;
generating, using a code numerically controlled oscillator, the local GNSS C/A code based on a unique C/A code that corresponds to the satellite; and
imparting, using a sigma-delta modulator, a fractional delay to the locally generated GNSS C/A code based (i) the averaged code delay received from the first loop filter, wherein the fractional delay is imparted to increase the accuracy of code delay tracking of the GNSS C/A signal received from the satellite, wherein the accuracy is improved by increasing a number of bits in an accumulator of the sigma-delta modulator.

10. The method of claim 9, further comprising
quantizing, using the sigma-delta modulator, the fractional delay of the locally generated GNSS C/A code into integer sample delays;
accumulating, using the sigma-delta modulator, the quantization noise, wherein the accumulated quantization noise is corrected for a next output and accumulated for a remaining error; and
continuously performing, using the sigma-delta modulator, error accumulation and correction to achieve noise shaping which results in low quantization noise in lower frequencies and high noise in higher frequencies, wherein the noise in higher frequencies is filtered out by averaging post correlation.

11. The method of claim 10, wherein the code numerically controlled oscillator imparts the integer samples delay to the locally generated GNSS C/A code based on an output of the sigma-delta modulator.

12. The method of claim 9, further comprising converting, using the sigma-delta modulator, a slow varying fractional number into a fast-varying integer number which is a code phase in GNSS Delay Locked Loop (DLL).

13. The method of claim 9, further comprising generating, using a carrier numerically controlled oscillator, a sinusoid to correct a phase error in correlation peaks, wherein a frequency of the sinusoid generated by the carrier numerically controlled oscillator is directly proportional to an averaged phase error at an output of a second loop filter of the GNSS receiver.

* * * * *